(12) United States Patent
Bey et al.

(10) Patent No.: US 7,243,541 B1
(45) Date of Patent: Jul. 17, 2007

(54) COMBI-SENSOR FOR MEASURING MULTIPLE MEASURANDS IN A COMMON PACKAGE

(75) Inventors: Paul P. Bey, Freeport, IL (US); Anthony M. Dmytriw, Freeport, IL (US); Christopher M. Blumhoff, Dixon, IL (US); Craig S. Becke, Freeport, IL (US); Jamie W. Speldrich, Freeport, IL (US); Richard W. Gehman, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/393,412

(22) Filed: Mar. 30, 2006

(51) Int. Cl.
    *G01D 11/24* (2006.01)
(52) U.S. Cl. ....................................... 73/431
(58) Field of Classification Search ............... None
    See application file for complete search history.

(56) References Cited

U.S. PATENT DOCUMENTS

| | | | |
|---|---|---|---|
| 6,181,574 B1 * | 1/2001 | Loibl ........................ | 361/816 |
| 6,724,612 B2 | 4/2004 | Davis et al. ................ | 361/328 |
| 6,769,285 B2 * | 8/2004 | Schneider et al. ........... | 73/1.06 |
| 6,867,602 B2 | 3/2005 | Davis et al. ................ | 324/664 |
| 6,871,537 B1 | 3/2005 | Gehman et al. ......... | 73/204.26 |
| 6,911,894 B2 | 6/2005 | Bonne et al. ................ | 338/25 |
| 6,929,031 B2 * | 8/2005 | Ford et al. .................. | 137/884 |
| 6,945,118 B2 | 9/2005 | Maitland, Jr. et al. ........ | 73/754 |
| 6,958,565 B1 | 10/2005 | Liu ........................ | 310/313 R |
| 2002/0166361 A1 * | 11/2002 | Wantz et al. ................ | 73/1.06 |
| 2004/0056765 A1 * | 3/2004 | Anderson et al. ........... | 340/522 |
| 2004/0250796 A1 * | 12/2004 | Veinotte ..................... | 123/520 |
| 2005/0022594 A1 | 2/2005 | Padmanabhan .......... | 73/204.26 |
| 2005/0204799 A1 * | 9/2005 | Koch ........................ | 73/1.06 |
| 2006/0186529 A1 * | 8/2006 | Shirasaka et al. ........... | 257/690 |
| 2006/0208848 A1 * | 9/2006 | Kawamoto et al. ....... | 338/22 R |

\* cited by examiner

*Primary Examiner*—Robert Raevis
(74) *Attorney, Agent, or Firm*—Kermit D. Lopez; Luis M. Ortiz; William B. Shelby

(57) ABSTRACT

A modular sensor system includes a plurality of varying types of sensors that provide multiple sensing measurands for sensing operations. A housing is generally associated with the varying types of sensors, such that the housing introduces media to be sensed by the sensors. An electrical interface can also be connected to the sensors, wherein the electrical interface permits a logical physical connection to be made to a selected sensor in order to maximize sensing sensitivity and provide a sensing repeatability and accurate sensor compensation thereof for the sensing operations.

4 Claims, 1 Drawing Sheet

COMBI-SENSOR FOR MEASURING MULTIPLE MEASURANDS IN A COMMON PACKAGE

TECHNICAL FIELD

Embodiments are generally related to sensing devices and methods, including flow sensors, pressure sensors, humidity sensors, and temperature or thermal sensors. Embodiments are also related to sensors for measuring multiple measurands.

BACKGROUND OF THE INVENTION

Sensors are utilized in a variety of flow, humidity, pressure and temperature sensing applications. Flow sensors, for example, are utilized in a variety of fluid-sensing applications for detecting the movement of fluids, which may be in gaseous (e.g., air) of liquid form. One type of flow measurement, for example, is based on thermal sensors, which can also be utilized to detect the property of a fluid. Thermal sensors may be implemented, for example, on silicon in microstructure form. For convenience sake, and without limitation, the term "flow sensor" can also be utilized to refer to such thermal sensors. The reader will appreciate that such sensors may be also utilized to measure primary fluid properties such as temperature, thermal conductivity, specific heat, and other properties; and that the flows may be generated through forced or natural convection.

One example of a flow sensor is disclosed in U.S. Patent Application No. 20050022594, entitled "Flow Sensor with Self-Aligned Flow Channel," to Aravind Padmanabhan, et al, which published on Feb. 3, 2005 and is assigned to Honeywell International Inc, and is herein incorporated by reference in its entirety. The device disclosed in U.S. Patent Application No. 20050022594 generally describes flow sensor having a substrate with a sensing element and flow channel aligned over the sensing element. The sensing element senses at least one property of a fluid. The flow channel is aligned by one or more guide elements formed in an alignment layer.

Another example of a flow sensor is disclosed in U.S. Pat. No. 6,871,537, entitled "Liquid Flow Sensor Thermal Interface Methods and Systems," which issued to Richard Gehman et al on Mar. 29, 2005 and is assigned to Honeywell International Inc., and also incorporated herein by reference in its entirety. A fluid flow sensor described in U.S. patent described in U.S. Pat. No. 6,871,537 measures the thermal conductivity of a fluid. The sensor includes one or more sensing elements associated with a sensor substrate. A heater is associated with the sensor and provides heat to the fluid. A film component isolates the fluid from the heater and the sensor, and conducts heat in a direction from the heater to the sensor, thereby forming a thermal coupling between the sensor, the heater and the fluid, which permits the sensor to determine a composition of the fluid by measuring thermal conductivity thereof without undesired losses of heat in other directions. The film component can be configured as a tube or a flow channel.

An example of a humidity sensor is disclosed in U.S. Pat. No. 6,724,612, entitled "Relative Humidity Sensor with Integrated Signal Conditioning," which issued to Davis et al on Apr. 20, 2004 and is assigned to Honeywell International Inc., and is also herein incorporated by reference in its entirety. The humidity sensor described in U.S. Pat. No. 6,724,612 relates to integrated relative humidity sensor that includes a planar humidity sensitive capacitor structure based on a thin porous platinum top plate, a humidity sensitive polyimide dielectric, and a metal (e.g., titanium-tungsten) bottom plate. Two capacitors are wired in series such that the metal bottom plates form the independent, electrically driven connections, and the thin platinum top layer is used to form the top plates and the floating series interconnection. Another example of a humidity sensor is disclosed in U.S. Pat. No. 6,867,602, entitled "Methods and Systems for Capacitive Balancing of Relative Humidity Sensors having Integrated Signal Conditioning," which issued to Davis et al on Mar. 15, 2005 and is assigned to Honeywell International Inc., and also incorporated herein by reference in its entirety.

An example of a pressure sensor is disclosed in U.S. Pat. No. 6,945,118 entitled "Ceramic on Metal Pressure Transducer," which issued to Maitland, Jr. et al on Sep. 20, 2005 and is assigned to Honeywell International Inc., and also incorporated herein by reference in its entirety. The device of U.S. Pat. No. 6,945,118 describes a pressure transducer apparatus based on a metal diaphragm molecularly bonded to a ceramic material to form a ceramic surface. A bridge circuit is connected to the ceramic surface of the metal diaphragm. An input pressure port for pressure sensing thereof is also provided, which connected to the metal diaphragm to thereby form a transducer apparatus comprising the metal diaphragm, the bridge circuit and the input pressure port.

It is often desirable to utilize more than one measurand in sensing applications. Typical sensor instrumentation utilized in medical applications, for example, use more then one measurand simultaneously to make calculations for measurements in the system. Usually the individual sensors utilized in such systems are either provided with calibrated or un-calibrated analog outputs or in the form of sensors with small-signal outputs, either of which may need to be conditioned and calibrated by the end user within the system.

In other cases the analog signals conditioned by the customer must pass through an analog-to-digital converter so that the output signals can be processed by the system which may be microcontroller-based. The most common measurands are pressure, flow, temperature or humidity. The output signals from the raw sensors are not linear and vary as a function of temperature. Variations must be taken into account and calibrated based on the accuracy required by the system.

Some sensors are packaged as raw sensors with simple electrical connection to the sensing element and others are packaged with compensation and/or amplification so as to simplify the electrical interface with a particular application. Few sensor outputs are presented through a digital interface which reduces the complexity of the customer interface requirements if it is a digitally processed system.

In order to improve such sensing applications and systems, it is believed that a modular sensing approach should be implemented as described in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved sensor.

It is another aspect of the present invention to provide for a modular sensor system that senses multiple measurands.

It is a further aspect of the present invention to provide for a combi-sensor for measuring multiple measurands in a common package.

The aforementioned aspects and other objectives and advantages can now be achieved as described herein. A modular sensor system is disclosed, which includes a plurality of varying types of sensors that provide multiple sensing measurands for sensing operations. A housing is generally associated with the varying types of sensors, such that the housing introduces media to be sensed by the sensors. An electrical interface can also be connected to the sensors, wherein the electrical interface permits a logical physical connection to be made to a selected sensor in order to maximize sensing sensitivity and provide a sensing repeatability and accurate sensor compensation thereof for the sensing operations.

Additionally, a substrate can be provided upon which the plurality of varying types of sensors is located. Such a substrate is generally attached to the housing and can be formed from a material such as, for example, ceramic. Alternatively, a molded lead-frame can be provided upon which the plurality of varying types of sensors is located. The molded lead-frame can be attached to the housing and may be formed from plastic. The housing itself can also be formed from plastic. The plurality of varying types of sensors can include one or more of the following types of sensors: a pressure sensing element, a flow sensing element, a humidity sensing element, and/or a temperature sensing element. The pressure sensing temperature sensing element. The pressure sensing element can be configured from a piezoresistive sensing element or a silicon-based capacitive sensing element. The flow sensing element can be provided in the form of a micro-bridge-based flow sensing element. The humidity sensing element can be provided as a capacitive-based sensing element.

The electrical interface can be implemented as, for example, one or more of the following types of electrical interfaces: a smart card, a group of electronic pins, and/or an electronic socket. Note that as utilized herein, the term "smart card" refers generally to a chip card or IC (integrated circuit) card. A smart card can contain one or more computer chips or integrated circuits for identification, data storage or special-purpose processing Additionally, an EEPROM can be provided, along with a plurality of conditioning electronics connected to the plurality of varying types of sensors. An ASIC can be connected to the EEPROM and to at least one sensor among the varying types of sensors, wherein the ASIC stores calibration data and pertinent sensor related information to the at least one sensor utilizing the EEPROM.

In general, a multiple measurand platform of sensors can be provided in the form of an array of either un-calibrated raw sensor connections or a fully calibrated set of measurands based on a user's requirements. Such a system can utilize either raw signals, amplified and/or digital output with either onboard calibration methods that present the sensor signals linearized and within required accuracy specifications. Additionally, calibration coefficients can be made available to a user for use in an end user application where sensor outputs are conditioned and compensated within a system using such coefficients. Finally, other information may be stored on a Combi-Sensor for optimal utilization by a user (e.g., sensor type/description, serial number, revision information, date or lot code, calibration coefficients as mentioned, etc.)

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
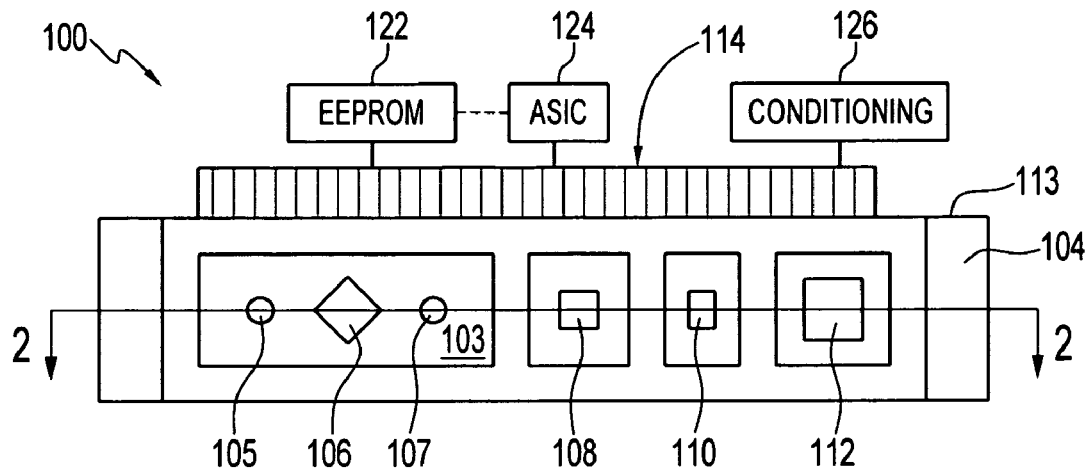
FIG. 1 illustrates a top cut-away view of a modular sensor system that can be implemented in accordance with a preferred embodiment.
Figure 2:
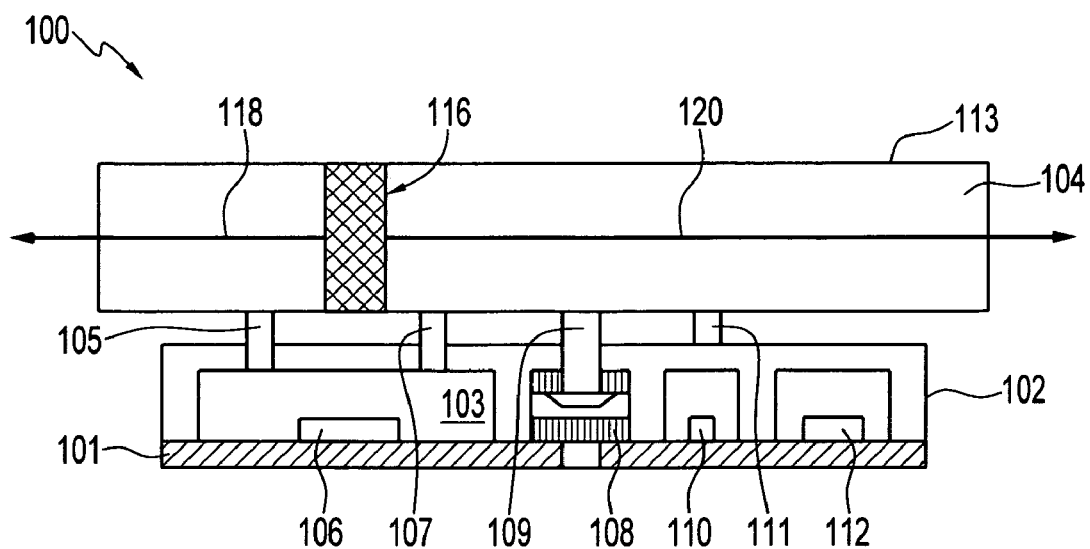
FIG. 2 illustrates a side sectional view of the modular sensor system depicted in FIG. 1 in accordance with a preferred embodiment.

FIG. 1 illustrates a top cut-away view of a modular sensor system 100 that can be implemented in accordance with a preferred embodiment. FIG. 2 illustrates a side sectional view of the modular sensor system 100 depicted in FIG. 1 in accordance with a preferred embodiment. Note that in FIGS. 1-2, identical parts or elements are generally indicated by identical reference numerals. The modular sensor system 100 can be implemented in the context of a "combi-sensor" package. System 100 generally includes a plurality of varying types of sensors 106, 108, 110, and/or 112 that can provide multiple sensing measurands for sensing operations. System 100 also includes a housing 102, which is associated with and maintains the sensors 106, 108, 110, and/or 112. The housing 102 introduces media to be sensed by the sensors 106, 108, 110, and/or 112.

The housing 102 can communicate with a flow tube 104 via flow channels 105, 107, 109, and/or 111. The flow tube 104 defined by tubular walls 113 and permits media (e.g., liquid or gas) flowing through the flow tube 104 to the housing 102 to contact sensors 106, 108, 110, and/or 112 maintained by the housing 102. The flow tube 104 can be provided with a restrictor 116 that restricts flow of fluid through flow tube 104 and provides for a bidirectional flow of fluid (e.g., air) as indicated by arrows 118 and 120. The restrictor 116 can function as a flow straightener in the shape of a narrow, elongated protrusion that prevents flow eddies, which create pressure instability. Such a configuration can be utilized to promote the bi-directional flow of fluid as indicated by arrows 118 and 120.

A fluid thus generally flows through the flow tube 104. Note that as utilized herein the term "fluid" refers generally to a liquid or a gas (e.g., air). The term "media" can also be utilized to refer to a fluid, air, gas, liquid, etc. that flows through the flow tube 104.

An electrical interface 114 is generally connected to the sensors 106, 108, 110, and/or 112. The electrical interface 114 permits a logical physical connection to be made to a selected sensor among the sensors 106, 108, 110, and/or 112 in order to maximize sensing sensitivity and provide sensing repeatability and accurate sensor compensation for sensing operations by system 100. The sensors 106, 108, 110, and/or 112 can be formed on a component 101, which may be, for example, a substrate attached to the housing 102. The substrate can be formed from a material such as ceramic. Component 101 can alternatively be provided as a molded lead-frame, which is also connected to the housing 102.

Note that housing 102 may be formed from a material such as plastic. Similarly, depending upon design considerations, the lead-frame (i.e., component 101) may be provided as a plastic lead-frame.

The sensor 106 can be implemented as a flow sensing element, while sensor 108 can be provided as a pressure sensing element. Sensor 110 can be implemented as a humidity sensing element and sensor 112 can be provided as a temperature sensing element. The flow sensing element or flow sensor 106 can be implemented as a micro-bridge based sensing element. The pressure sensing element or pressure sensor 108 can be provided as piezoresistive sensing element or a silicon-based capacitive sensing element, depending upon design considerations. The humidity sensor 110 can be implemented as a capacitive-based humidity sensing element. Sensor 112 can be implemented as a flow, pressure, temperature and/or humidity sensor, depending upon design considerations and may communicate or be integrated with an ASIC (e.g., see ASIC 124), depending upon design considerations.

The flow sensor 106 can be maintained within an air flow bypass chamber 103 which communicates with the flow tube 104 via flow channels 105 and 107. Additionally, a flow channel 109 permits the pressure sensor 108 to come into contact with fluid flow through flow tube 104. Additionally, the electrical interface 114 can be configured to communicate with and/or be integrated with an Electrically Erasable Read Only Memory (EEPROM) 122. A plurality of conditioning electronics 126 can also communicate with and/or form a part of electrical interface 114. Such conditioning electronics 126 can be connected to the sensors 106, 108, 110, and/or 112 via the electronic Interface 114. An Application Specific Integrated Circuit (ASIC) 124 can be connected to the EEPROM 122 and to one or more or the sensors 106, 108, 110, and/or 112. Such an ASIC 124 can be utilized to store calibration data and pertinent sensor related information to one or more of the sensors 106, 108, 110 and/or 112 utilizing the EEPROM 122. In general, ASIC 124 can be implemented as a microchip that is designed essentially from "scratch" for a specific application. ASIC chips are specially designed chips that provide unique functions. ASIC chips can replace general-purpose commercial logic chips, and integrate several functions or logic control blocks into one single chip, lowering manufacturing cost and simplifying circuit board design.

The sensors 106, 108, 110 and 112 can be based respectively on a selection of a micro-bridge-based flow sensing element, a piezoresistive or silicon-based capacitive pressure sensing element, a capacitive-based humidity sensing element and/or a combination thereof. Such technologies can be optimized for the packaging techniques used in the platform of system 100. The package or system 100 can be based on a combination of either a substrate made of FR-4 or ceramic or a molded lead-frame (i.e., see component 101) that is attached to a plastic housing which introduces the media to be sensed to the sensing elements 106, 108, 110 and/or 112.

Conditioning electronics 126 can be mounted and connected to the sensing elements 106, 108, 110 and/or 112 on the substrate 101 and the outputs can be generated using one or more ASIC(s) 124 that store calibration coefficients and pertinent sensor related information using the EEPROM 122. The EEPROM 122 can be programmed at the time of manufacturing/calibration and can be either read internally to the ASIC(s) 123 by a user and/or as specified by the operation of the Combi-Sensor or system 100.

System 100 can provide a modular construction that combines multiple measurand sensors 106, 108, 110, and/or 112 into a single package with a combination of either raw sensor or calibrated amplified analog and/or digital outputs. The design of system 100 offers optimal electrical interfaces so that its use in the end application can simplify a user's design and usage requirements. System 100 can include a package that makes logical physical connections to the measurands of choice so as to maximize the sensitivity and ability to repeatability and accurately compensate for their operation.

The combination of the sensors 106, 108, 110 and/or 112 in the system 100 will be will be such that all of the standard requirements for any individual sensor's fundamental specifications will be met (e.g., vibration, shock, package stress compatibility, humidity susceptibility, EMI/EMC, electrical interface specifications, accuracy, repeatability, hysteresis, linearity, etc). The packaging scale of system 100 can meet the dimensional requirements so that it can be used in existing applications while offering the efficient use of space or logical sensor arrangements of the individual sensors 106, 108, 110 and/or 112.

System 100 can be provided as a modular multiple measurand platform of sensors 106, 108, 110, and/or 112 in an array of either un-calibrated raw sensor connections or a fully calibrated set of measurands (e.g., alternatively selectable) based on a user's requirements with either raw signals, amplified and/or digital output with either onboard calibration techniques that present the sensor signals linearized and within required accuracy specifications or possibly such that calibration coefficients are available to the customer for use in the end user application where sensor outputs are conditioned and compensated within their system using the coefficients. Other information may be stored on the Combi-Sensor or system 100 for optimal utilization by the user (e.g., sensor type/description, serial number, revision information, date or lot code, calibration coefficients as mentioned, etc.).

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A modular sensor system, comprising:
   a housing;
   a plurality of sensors maintained within said housing wherein each sensor of said plurality of sensors senses a different measurand of a media in a flow tube defined by a tubular wall and said housing introduces said media to said plurality of sensors;
   a molded lead-frame upon which said plurality of sensors is located, wherein said molded lead-frame is attached to said housing; and
   an electrical interface connected to said plurality of sensors, thereby implementing a modular sensor system for measuring multiple measurands in a single common package.

2. The system of claim 1 further comprising a substrate upon which said plurality of sensors is located, wherein said substrate is attached to said housing.

3. A method of forming a modular sensor system, comprising:

providing a plurality of sensors wherein each sensor of said plurality of sensors senses a different measurand of a media in a flow tube defined by a tubular wall associating a housing with said plurality of sensors, wherein said plurality of sensors are maintain within said housing and said housing introduces said media to said plurality of sensors;

providing a molded lead-frame upon which said plurality of sensors is located, wherein said molded lead-frame is attached to said housing; and connecting an electrical interface to said plurality of sensors, thereby implementing a method of forming a modular sensor system for measuring multiple measurands in a single common package.

4. The method of claim 3 further comprising providing a substrate upon which said plurality of sensors is located, wherein said substrate is attached to said housing.

* * * * *